June 16, 1936.  A. B. WELTY  2,044,139
HARVESTER THRESHER
Filed Aug. 20, 1934  3 Sheets-Sheet 2

Inventor
Albert B. Welty
By V. F. Sarrague
Atty.

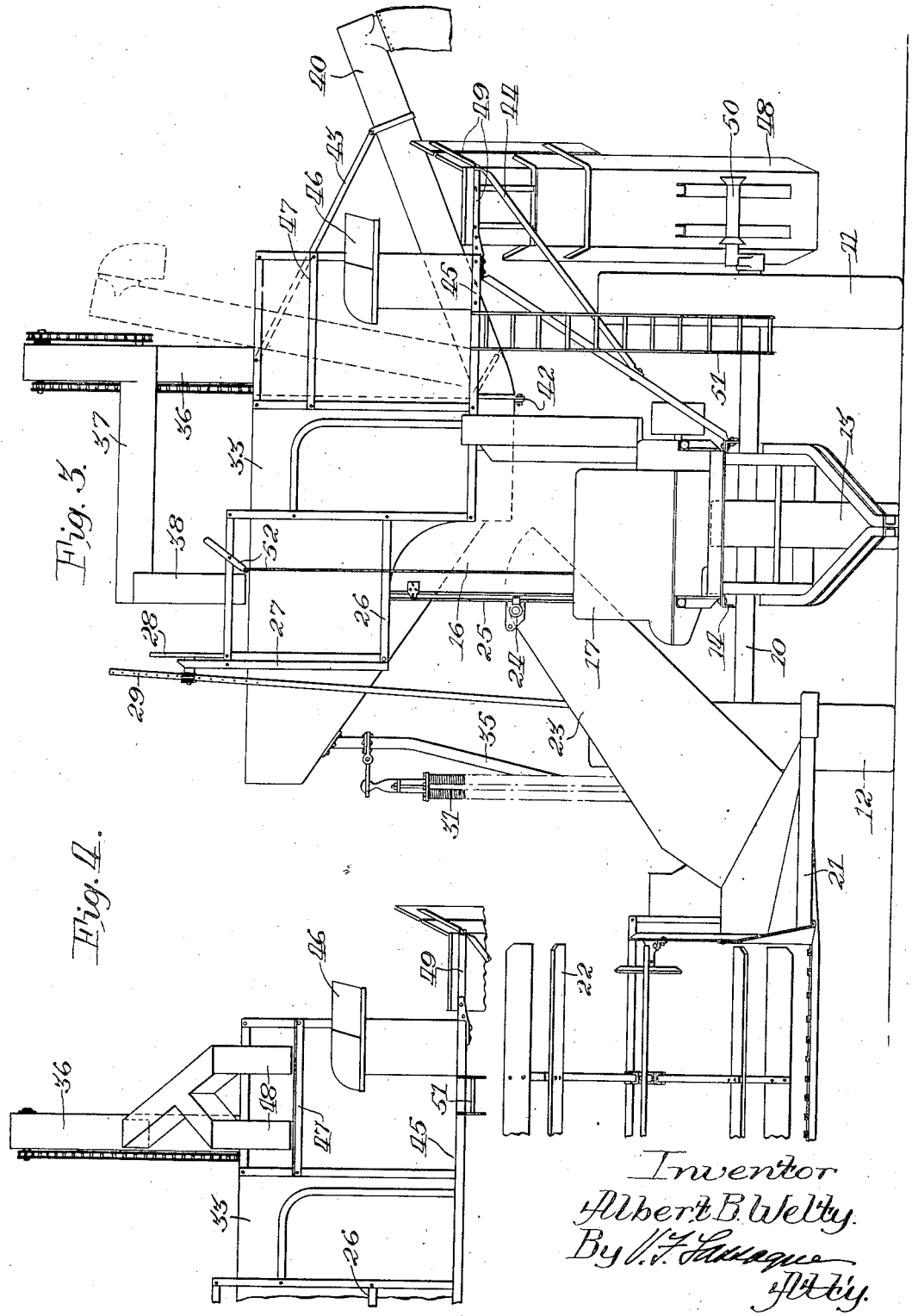

Patented June 16, 1936

2,044,139

UNITED STATES PATENT OFFICE 2,044,139

HARVESTER-THRESHER

Albert B. Welty, Moline, Ill., assignor to International Harvester Company, a corporation of New Jersey Application August 20, 1934, Serial No. 740,610

2 Claims. (Cl. 56—122)

The invention relates to harvester threshers and particularly to means which will facilitate the use of such machines for either bagging the grain or storing it in so called tanks.

Sometimes the user of the harvester thresher finds conditions such that he desires to employ a tank on the machine for accumulating the threshed material, and at other times he will want to bag the grain, or the like. It is not uncommon for the user to meet both conditions of use on the same day with the same machine. For example, starting out on a certain morning for the day's work, the farmer may have both wheat and peas to harvest and thresh. Because of dampness in the morning, it may be impossible to harvest the peas. The grain may be in condition, so the farmer cuts his grain and employs the tank provided on the machine to accumulate the threshed crop. Later on in the day, the field of peas dries out sufficiently for threshing, so the user moves his machine to the field of peas. But first, with machines as now built, he must remove the tank and mount a bagging attachment and chute on the machine, as peas are invariably bagged This change causes considerable delay and hard work, as the parts involved in such rebuilding of the machine are large and heavy and awkward to handle.

Accordingly, it is found highly desirable to provide harvester threshers of a type in which it will be possible to mount both a tank and a bagger's attachment simultaneously, both parts being thus always in position and available for instant use.

Therefore, the main object of the invention is to provide a harvester thresher carrying simultaneously both a tank and a bagger's attachment.

Another object is to conveniently locate these parts relative to each other and to the elevator discharging the threshed crop, so as facilitate the threshing operation.

Other objects will be apparent to those skilled in this art as the disclosure is more fully made.

Briefly, such objects are generally attained by providing a harvester thresher on which is mounted simultaneously both a tank and bagger's attachment, either avilable for practically instant use, as will presently appear. In the accompanying sheets of drawings illustrating a practicable example of the invention,—

Figure 3 is a front elevational view showing the tank in use; and,

Figure 4 is a fragmentary front view showing the bagging attachment in use.

Figure 1:
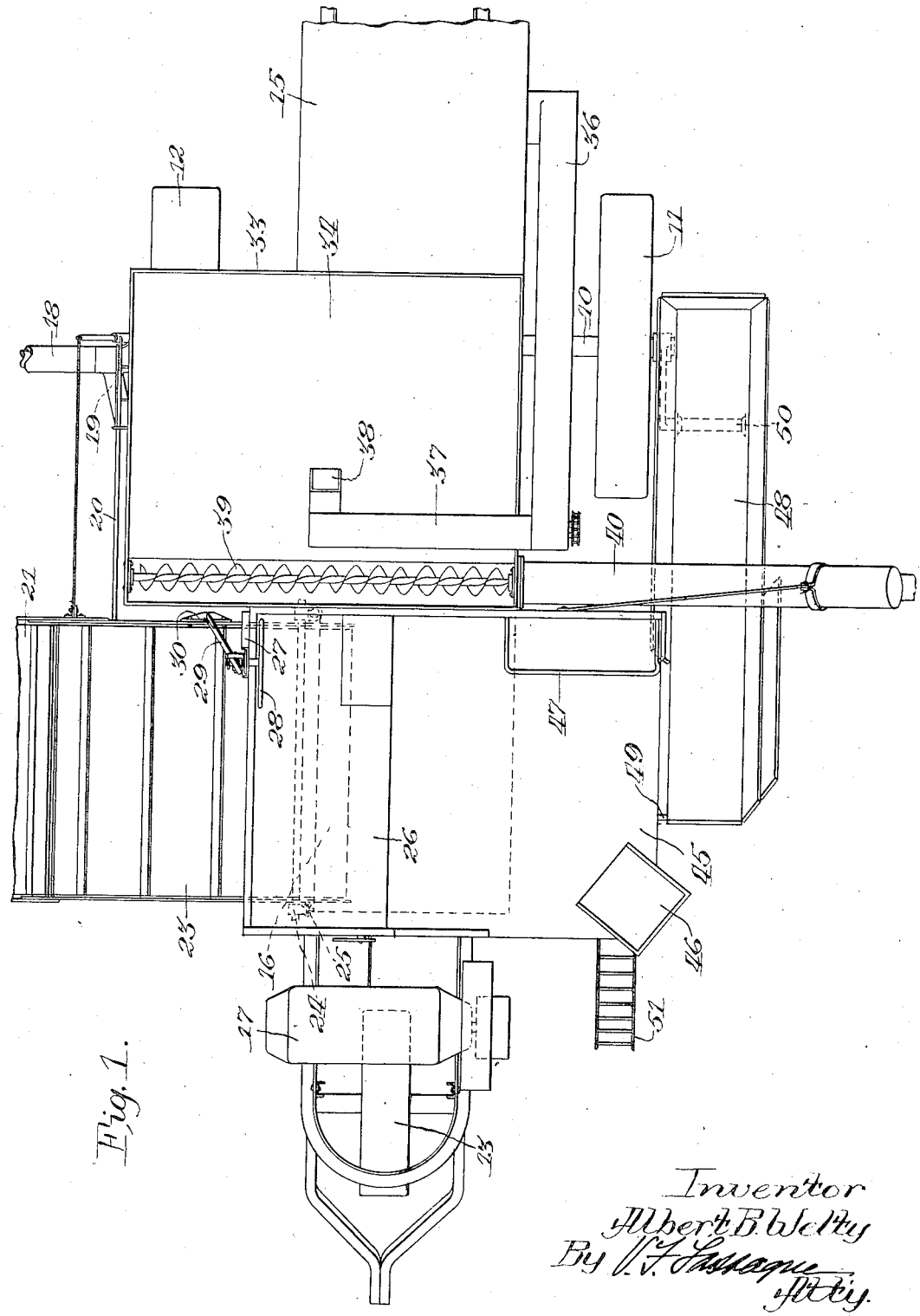
Figure 1 is a plan view of the harvester thresher on which is mounted both a tank and a bagger's platform including a bag chute.

The harvester thresher in any appropriate manner is carried on a transverse axle 10 on which is journaled a stubbleward wheel 11 and a grainward wheel 12. The front end is carried on a steering wheel truck 13. The main frame is shown at 14, the same carrying a thresher or separator 15 forwardly of which is a feeder house 16 open at its grainward side, and, ahead of the house 16, the frame carries a motor 17 for driving the operative parts of the machine in any desired manner.

The axle 10 is extended grainwardly of the wheel 12 and carries a rocking support 18 including a bracket 19 carrying a forwardly extending line lever 20 in turn carrying in any usual way the harvester platform 21 including the reel 22. The stubbleward end of the platform carries an upwardly and stubblewardly inclined elevator 23 which extends into the feeder house 16 to discharge the cut crop from the platform thereinto, said elevator being connected for up and down movement by means of guides 24 to upright rails 25 adjacent the house 16.

Carried on the feeder house 16 is an operator's deck or platform 26 at which is located on a support 27 a hand wheel 28 for operating a vertical rack bar 29 having its lower end connected through a bracket 30 to the rear side of the elevator 23. In this manner the platform 21 may be raised and lowered by the operator to change the height of cut in a manner well understood in this art, there being a counterbalancing spring 31 to assist such adjustment.

Figure 2:
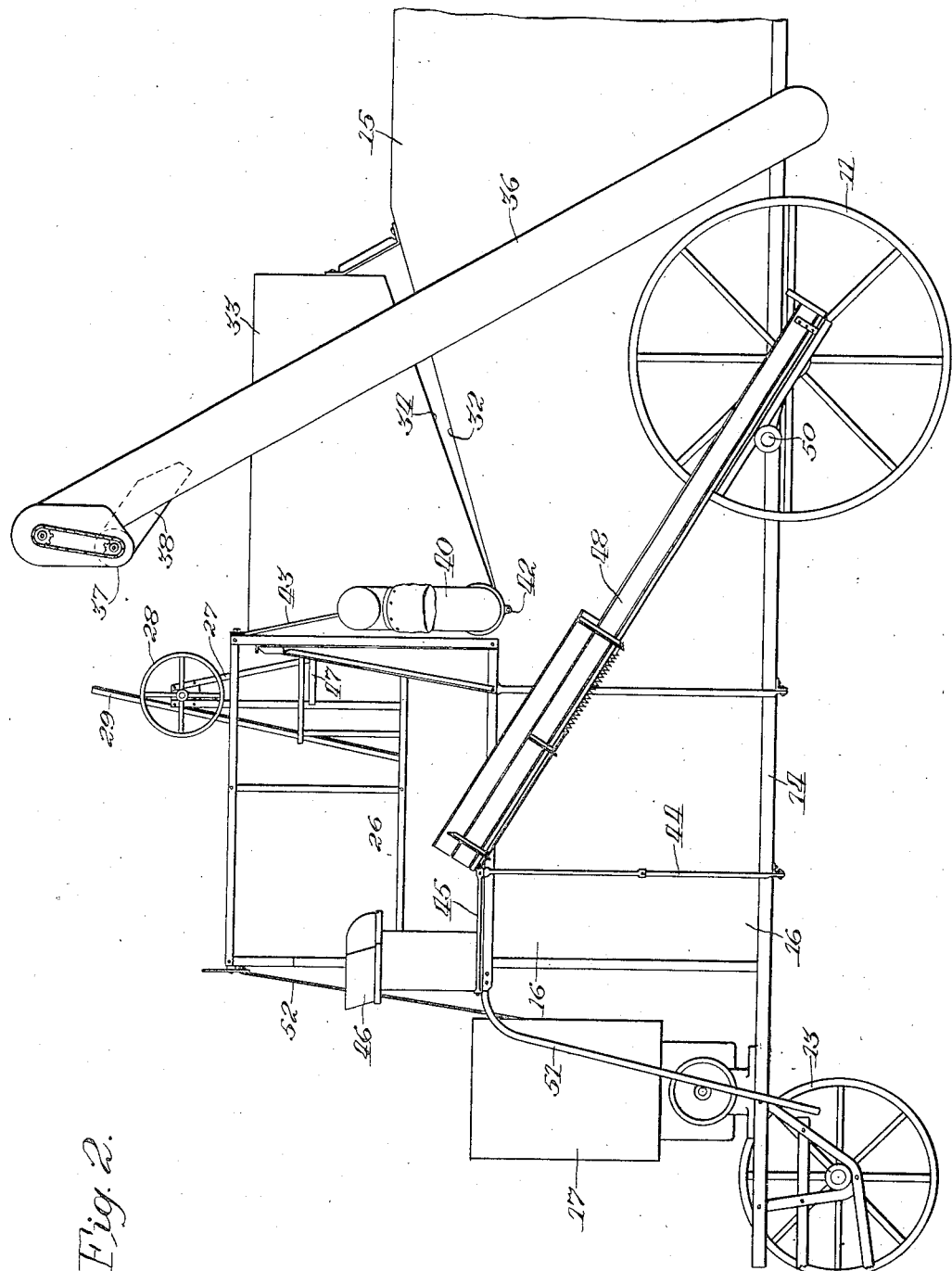
Figure 2 is an elevational view of the machine showing the stubbleward side thereof.

Looking to Figure 2, it will be seen that the top of the thresher 15 is sloped downwardly and forwardly at 32. Transversely across this portion of the thresher roof is mounted a grain tank or bin 33, said tank having a sloped bottom 34 conforming to the slope 32 and being transversely extended to overhang the grainward wheel 12, as shown in Figure 3. This overhanging portion of the tank is supported by a post 35 to which the spring 31 is connected. The weight of the tank is thus balanced over the wheel 12.

An elevator 36 takes the threshed material from the thresher 15 and conveys it upwardly to a cross conveyer 37 and a chute 38 for discharging the grain into the tank 33 when it is desired to use the tank. An auger 39 is transversely arranged across the lower portion of the tank bottom, which auger may be driven in any desired way when emptying the tank. Said auger 39 conveys the material through a spout 40 extending stubblewardly of the machine to discharge the grain into a wagon or the like in accordance with the well established practice. This spout 40 is hinged at 41 and by removing a latch 42 can be swung up to the folded dotted line position of Figure 3 when not in use, upon removing a brace 43.

Suitably carried on the house 16 and the frame 10 by braces 44 is a horizontal bagger's platform 45, said platform 45 being located stubblewardly of the operator's deck 26 and at a slightly lower level. Thus, these two decks 26, 45 are just a step from each other and communicate conveniently. The platform 45 carries at its front stubbleward corner a bagger's seat 46, and at the rear end of the platform 45 is a bag holder 47 capable of holding at least two bags in position to receive grain from a double spout 48 (see Figure 4) mounted on the elevator 36 in lieu of the conveyer 37. When a bag is filled, it is dropped onto the upper end of an inclined bag chute 48 carried at its upper end by a transverse support 49 and at its lower end by a support 50 connected with the axle structure 10, as shown. The chute is thus mounted on the stubbleward side of the machine and the bags slide down the same to be discharged onto the field. The platform 45 is accessible by means of a ladder 51.

The operator's control station 26 includes means 52 for controlling the operation of the motor 17, as shown.

From this disclosure it will now be seen that a unitary harvester thresher structure is provided embodying simultaneously both a tank and bagger's attachment, either of which is substantially instantly available for use. When the tank is used, the elevator 36 is provided with the cross conveyer and chute 37, 38 for loading the tank. When the bagger is to be used, this structure 37, 38 is removed and in lieu thereof the elevator 36 is provided with the double spout chute 48 for directing the material to bags held by the holder 47. Thus, the tank 33 and platform 45 are conveniently located relative to the elevator 36, so that by simply using the parts 37, 38 or 48, the grain may easily be bagged or tanked as desired without any great effort or loss of time. The top of the tank 33 is open and the platforms 26, 45 are so located with respect to the tank that an operator at either station can look into the tank and observe the progress of the tank filling operation.

It is the intention to cover all changes and modifications not departing from the scope of the invention as indicated by the definitions thereof comprising the appended claims.

What is claimed is:

1. A harvester thresher embodying a longitudinal thresher body having a feeder house at its forward end, a transversely disposed harvester for cutting and feeding grain into the feeder house through an opening formed in the grainward side thereof, said body having a longitudinally inclined roof portion with its lower end terminating at the rear end of the feeder housing, a grain tank having an inclined bottom carried on the body above the said inclined roof portion, said tank overhanging the grainward side of the body and having a front wall disposed transversely at the rear end of the feeder housing, an operator's deck carried on the feed housing in advance of the tank and at a level to enable an operator standing thereon to look over the front wall of the tank and thereinto to inspect the contents thereof, a bagger's platform carried on the feeder housing in communication with the aforementioned deck, said platform being disposed in advance of the tank and overhanging the stubbleward side of the feed housing, an inclined longitudinal bag chute adjacent the stubbleward side of the platform with its front upper end carried adjacent the platform and its low end carried adjacent the body laterally of and below the tank, and a transversely disposed tank unloader having a normal position disposed stubblewardly over the bag chute.

2. A harvester thresher embodying a longitudinal thresher body having a feeder house at its forward end, a transversely disposed harvester for cutting and feeding grain into the feeder house through an opening formed in the grainward side thereof, a grain tank carried on the body, one end thereof overhanging the grainward side of the body, said tank having an inclined bottom and a transverse front wall, the low end of the bottom being disposed adjacent said wall, an operator's deck carried on the feed housing immediately adjacent and forwardly of the front wall of the tank and at a level to enable an operator standing thereon to look over the wall and inspect the contents of the tank, a bagger's platform carried on the feeder housing in step-down relation to the deck in front of the tank wall, said platform overhanging the stubbleward side of the feed housing, an inclined longitudinal bag chute located adjacent the stubbleward side of the platform with its front upper end carried adjacent the platform and its low end carried adjacent the body laterally of and below the tank, and a transversely disposed unloader operatively associated with the tank and having a normal position extending stubblewardly over the bag chute.

ALBERT B. WELTY.